(12) United States Patent
Deevi

(10) Patent No.: US 7,857,128 B2
(45) Date of Patent: Dec. 28, 2010

(54) LAMINATED METAL FOIL PACKAGING MATERIAL AND METHOD OF MAKING

(75) Inventor: Sarojini Deevi, Midlothian, VA (US)

(73) Assignee: Philip Morris USA Inc., Richmond, VA (US)

( * ) Notice: Subject to any disclaimer, the term of this patent is extended or adjusted under 35 U.S.C. 154(b) by 579 days.

(21) Appl. No.: 10/754,697

(22) Filed: Jan. 12, 2004

(65) Prior Publication Data

US 2004/0139702 A1   Jul. 22, 2004

Related U.S. Application Data

(62) Division of application No. 09/907,619, filed on Jul. 19, 2001, now abandoned.

(51) Int. Cl.
*B65D 85/12* (2006.01)

(52) U.S. Cl. .................. 206/271; 206/273; 206/274; 206/275

(58) Field of Classification Search ............. 428/461, 428/466, 469, 472.2, 607, 617, 621, 627, 428/650, 905, 34.2, 34.3, 35.3, 35.8, 35.9, 428/464; 206/245, 271, 272, 273, 274, 275, 206/276

See application file for complete search history.

(56) References Cited

U.S. PATENT DOCUMENTS

| | | | |
|---|---|---|---|
| 3,379,754 A | 4/1968 | Bernstein | 260/519 |
| 3,568,387 A | 3/1971 | Grabow | 52/306 |
| 3,580,259 A | 5/1971 | Luttich | 131/144 |
| 3,625,224 A | 12/1971 | Leffingwell | 131/17 R |
| 3,722,516 A | 3/1973 | Suwa et al. | 131/17 R |
| 3,750,674 A | 8/1973 | Miller | 131/17 R |
| 3,879,425 A | 4/1975 | Hall et al. | 264/340.9 |
| 3,881,025 A | 4/1975 | Flament | 426/537 |
| 3,884,247 A | 5/1975 | Dietrich et al. | 131/17 R |
| 3,890,981 A | 6/1975 | Vinals et al. | 131/144 |
| 3,903,900 A | 9/1975 | Wolt et al. | 131/17 R |
| 3,906,893 A * | 9/1975 | Scales | 118/63 |
| 3,914,451 A | 10/1975 | Schreiber et al. | 426/534 |
| 3,915,175 A | 10/1975 | Dietrich | 131/17 R |
| 3,920,027 A | 11/1975 | Demole | 131/17 R |
| 3,924,644 A | 12/1975 | Anderson et al. | 131/17 R |
| 3,937,228 A | 2/1976 | Demole | 131/17 R |
| 3,943,943 A | 3/1976 | Cartwright et al. | 131/17 R |
| 3,949,114 A * | 4/1976 | Viola et al. | 428/337 |
| 3,952,868 A | 4/1976 | Müller et al. | 206/273 |
| 3,961,111 A * | 6/1976 | Smith | 427/419.2 |

(Continued)

OTHER PUBLICATIONS

McGraw-hill Dictionary of Chemical terms, Sybill P. Parker, McGraw-hill, New York, 1985, (p. 106).*

(Continued)

*Primary Examiner*—Kevin R. Kruer
(74) *Attorney, Agent, or Firm*—Buchanan Ingersoll & Rooney PC

(57) ABSTRACT

A laminate including a flavorant useful for packaging cigarettes or other products such as food products. The laminate includes crosslinked polymer coatings adhered to at least two metal foils, and a volatile flavor component such as menthol is applied to one of the polymer-coated surfaces. The laminate minimizes loss of volatile and/or heat sensitive flavor components from the package during extended periods at elevated temperature which are often associated with long term storage and/or shipping.

17 Claims, 3 Drawing Sheets

U.S. PATENT DOCUMENTS

| | | | | |
|---|---|---|---|---|
| 3,968,287 | A | * | 7/1976 | Balk .......................... 428/136 |
| 4,092,202 | A | * | 5/1978 | Bergk et al. .............. 156/331.7 |
| 4,119,479 | A | | 10/1978 | Williams, Jr. et al. ....... 156/274 |
| 4,119,743 | A | * | 10/1978 | Lu .............................. 427/506 |
| 4,163,684 | A | | 8/1979 | Kartanson ................... 156/259 |
| 4,220,847 | A | | 9/1980 | Focke et al. ................. 219/388 |
| 4,250,994 | A | | 2/1981 | Focke ......................... 206/273 |
| 4,286,712 | A | | 9/1981 | Focke ......................... 206/264 |
| 4,293,068 | A | * | 10/1981 | Focke et al. ................. 206/264 |
| 4,363,841 | A | | 12/1982 | Snow ........................... 428/35 |
| 4,386,925 | A | | 6/1983 | Focke ......................... 493/338 |
| 4,556,590 | A | | 12/1985 | Martin ......................... 428/35 |
| 4,567,112 | A | | 1/1986 | Bernhard ..................... 428/461 |
| 4,613,536 | A | | 9/1986 | Mäkilaakso ................. 428/124 |
| 4,735,669 | A | | 4/1988 | Guida et al. ................ 156/229 |
| 4,778,712 | A | | 10/1988 | Akao .......................... 428/213 |
| 4,789,060 | A | | 12/1988 | Focke et al. ................. 206/274 |
| 4,806,398 | A | | 2/1989 | Martin, Jr. .................. 428/34.2 |
| 4,807,745 | A | | 2/1989 | Langley et al. .............. 206/245 |
| 4,887,408 | A | * | 12/1989 | Mattei et al. .................. 53/412 |
| 4,948,640 | A | | 8/1990 | Gibbons et al. ............ 428/34.9 |
| 4,956,210 | A | | 9/1990 | Hoyt et al. .................. 428/35.3 |
| 5,077,104 | A | | 12/1991 | Hunt et al. .................. 428/34.3 |
| 5,098,751 | A | | 3/1992 | Tamura et al. ............. 428/35.8 |
| 5,249,676 | A | | 10/1993 | Ashcraft et al. ............. 206/264 |
| 5,333,729 | A | | 8/1994 | Wolfe ......................... 206/268 |
| 5,427,235 | A | * | 6/1995 | Powell et al. ............... 206/245 |
| 5,662,926 | A | * | 9/1997 | Wick et al. .................. 424/448 |
| 5,753,779 | A | * | 5/1998 | Verberg ...................... 525/369 |
| 5,759,422 | A | | 6/1998 | Schmelzer et al. ............ 216/35 |
| 5,951,801 | A | | 9/1999 | Weissenfluh et al. ........ 156/164 |
| 6,083,628 | A | | 7/2000 | Yializis ...................... 428/463 |
| RE37,934 | E | * | 12/2002 | Hoffmann ................... 424/449 |
| 6,790,496 | B1 | * | 9/2004 | Levander et al. ........... 428/35.7 |
| 2004/0241454 | A1 | * | 12/2004 | Shaw et al. .............. 428/425.5 |

OTHER PUBLICATIONS

J. D. Affinito et al., "*PML/oxide/PML Barrier Layer Performance Differences Arising from Use of UV or Electron Beam Polymerization of the PML Layers*", published in Thin solid Films, 308-309, (1997), pp. 19-25 by Elsevier Science S.A.

* cited by examiner

LAMINATED METAL FOIL PACKAGING MATERIAL AND METHOD OF MAKING

This application is a divisional application of U.S. application Ser. No. 09/907,619 entitled LAMINATED METAL FOIL PACKAGING MATERIAL AND METHOD OF MAKING, filed on Jul. 19, 2001 now abandoned, the entire content of which is hereby incorporated by reference.

FIELD OF THE INVENTION

The present invention relates generally to packaging materials and methods of making packaging materials. In particular, the present invention relates to packaging materials for cigarettes which include volatile and/or heat sensitive flavoring agents such as menthol.

BACKGROUND OF THE INVENTION

Packaging materials for products such as food, film, chemicals, and other goods may incorporate metal foil, polymeric and/or adhesive layers of material. See, for example U.S. Pat. Nos. 4,119,479; 4,363,841; 4,556,590; 4,567,112; 4,613,536; 4,778,712; 4,806,398; 4,948,640; 4,956,210; 5,077,104; 5,098,751; 5,759,422; and 6,083,628. See also an article by J. D. Affinito et al entitled "PML/oxide/PML barrier layer performance differences arising from use of UV or electron beam polymerization of the PML layers", published in Thin Solid Films, 308-309, (1997), pp. 19-25 by Elsevier Science S.A.

Filter cigarettes are typically sold in packages containing about twenty cigarettes. The packages are generally rectangular, in the form of "hard packs", "crush proof boxes", "hinged lid packages", or "soft packs." The packages are normally packed in cartons with typically ten packages to a carton. The polymeric overwrap material typically includes an oriented polypropylene. See, for example, U.S. Pat. Nos. 3,952,868; 4,163,684; 4,220,847; 4,250,994; 4,286,712; 4,293,068; 4,386,925; 4,789,060; 4,807,745; 5,249,676; 5,333,729; and 5,427,235.

Conventional cigarette packages are designed to maintain the freshness and moisture content of the cigarettes and to protect the cigarettes from adverse environmental conditions which decrease the freshness and quality of the cigarettes. Cigarette packages typically include three separate wrappings: (1) an inner foil liner comprising a metal foil laminated to a paper substrate or a metallized paper which is wrapped about the cigarettes and folded, but not sealed, at the ends of the cigarettes; (2) a "soft" or "hard" paper or paperboard package which is usually imprinted with brand specific information; and (3) an exterior clear overwrap of a heat sealable polymeric film which is heat sealed.

"Tear tapes" are commonly provided for easy opening of the polymeric overwrap films. When the top of the package is opened, the foil inner liner is torn open in the case of the soft pack or the hinged lid of the hard pack is pivoted open and a portion of the foil inner liner is removed to expose the ends of the cigarettes.

Under normal storage conditions, conventional cigarette packages are capable of maintaining the freshness and moisture content of the cigarettes at an acceptable level for a limited period of time. Thus, if the cigarette packages are stored too long, or if the cigarette packages are stored in unusually hot and/or dry atmospheric conditions, the conventional package does not adequately preserve the freshness and moisture content of the cigarettes.

Various flavoring components have been incorporated into tobacco products. Menthol is a common flavor component. The high degree of volatility and ease of sublimation of flavoring components such as menthol in tobacco products have presented problems in cigarette manufacturing operations, and have resulted in a decreased shelf-life of the products due to losses of flavorant by evaporation on storage.

On long term shipping and/or storage, cigarette packages are often subjected to relatively high temperatures (i.e., in excess of room temperature) for extended periods of time. This exacerbates the problems associated with conventional packaging in maintaining desirable levels of the flavor components.

One method for preventing premature volatilization of a smoking composition flavorant additive is by encapsulating the flavorant in microcapsules. A limitation of this technique is that the microcapsules tend to separate from the fillers and produce products with variable quantities of flavorant.

The foil inner liner of conventional cigarette packages has a primarily decorative purpose, and provides little or no barrier to the passage of oxygen and moisture between the cigarettes in the pack and the surrounding atmosphere. However, one approach for reducing the permeability of the foil is by laminating the foil with a thin layer of polyvinyl chloride. However, on long term shipping and/or storage, the foil liner tends to yellow over time, resulting in a package that is commercially undesirable. Further, flavorings such as menthol are often applied to the foil in the form of alcohol solutions, which can react with aluminum and adversely affect conventional cigarette packaging on long term exposure to relatively high temperatures.

U.S. Pat. No. 4,807,745 to Langley et al. discloses a heat sealed barrier package for cigarettes. The package material comprises a relatively thick laminate made of a foil layer to which two layers of biaxially oriented polypropylene homopolymer are adhesively bonded on opposite sides. Exterior and interior surface layers of a heat sealable thermoplastic polymer are applied, resulting in a laminate having a thickness of between about 1.5 to about 2.5 mils. The laminate is purportedly useful as an overwrap for a soft or hard pack or as a sealed inner liner for a soft or hard pack.

While the package of Langley et al. provides a more effective barrier than a single layer of foil, it would be advantageous to provide packaging materials which further reduce the permeability of moisture and oxygen through the packaging material.

It is therefore an object of the present invention to provide new packaging materials for cigarettes and other tobacco articles that are better able to withstand the conditions associated with long term shipping and/or storage. It would be particularly desirable to provide packaging materials for tobacco articles which include volatile and/or heat sensitive flavor components which minimizes the loss of the volatile and/or heat sensitive flavor components without undergoing a significant degree of discoloration.

SUMMARY OF THE INVENTION

The invention provides a laminate comprising a metal foil layer having opposed major surfaces, a metal oxide layer on each of the major surfaces of the foil, a crosslinked polymer coating adhered to the metal oxide layer on both sides of the metal foil, and a flavor component applied to one side of the laminate.

The invention also provides a method for forming a laminate containing a flavorant comprising (a) feeding a first metal foil with a layer of metal oxide on both sides of the first metal foil and applying a layer of crosslinkable monomer to both sides of the first metal foil, (b) feeding a second metal foil with a layer of metal oxide on both sides of the second metal foil and applying a layer of crosslinkable monomer to both sides of the second metal foil, (c) forming a laminate by adhering the monomer coating on one side of the first metal foil to the monomer coating on one side of the second metal foil, (d) curing the monomer coatings, and (e) applying a flavor component to one side of the laminate.

DETAILED DESCRIPTION OF THE PREFERRED EMBODIMENTS

Definitions

Figure 1A:
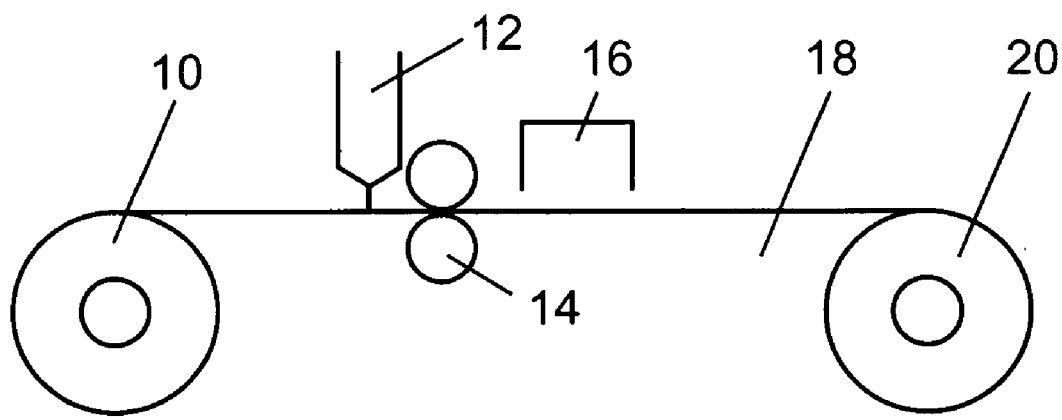
FIG. 1 is a schematic illustration of a process for forming a cross-linked polymer coated foil according to the invention.

"Electromagnetic Radiation" as used herein refers to energy waves of the electromagnetic spectrum including, but not limited to, x-ray, ultraviolet, visible, infrared, far infrared, microwave and radio-frequency.

"Visible light" as used herein refers to energy waves having a wavelength of at least approximately $4.0 \times 10^{-5}$ cm.

"Ultraviolet light" as used herein refers to energy waves having a wavelength of at least approximately $1.0 \times 10^{-5}$ cm but less than $4.0 \times 10^{-5}$ cm.

Laminated metal foils useful for forming packaging are provided. The laminated metal foils according to the invention can be used for packaging cigarettes, especially cigarettes which are flavored with volatile and/or heat-sensitive flavor components such as menthol. Packaging such as cigarette packaging made from the laminated foils is also provided. Methods of making the laminates and methods of making cigarette packaging from the laminates are also disclosed.

The packaging according to the invention can be used to minimize the loss of volatile and/or heat sensitive flavor components from the packaging during extended periods of storage, particularly during storage at elevated temperature which are often associated with long term storage and/or shipping. The packaging material according to the invention can also minimize discoloration of the packaging caused by migration of volatile flavoring components. Discoloration of the packaging material can adversely affect the marketability of the goods.

The laminated foil according to the invention includes one or more relatively thin layers of a crosslinked polymer adhered to both surfaces. The laminate optionally includes a flavor component such as menthol. The flavor component can be coated onto one side of the laminated foil or, alternatively, the flavor component can be coated onto or impregnated into a material (e.g., paper) which can then be applied to one side of the laminated foil. The side to which the flavor component is applied can then be used to form the inside of the cigarette packaging.

The resulting laminated foil can be formed into an appropriate cigarette package using standard techniques. For example, a cigarette package can be made by folding the foil into the desired shape and adhering the flaps with an appropriate adhesive.

In a preferred embodiment of the invention, the resulting packaging material may optionally have a permeability of $\leq 0.5$ cc$O_2$/m$^2$-day and $\leq 1.55$ g $H_2O$/m$^2$-day.

The foil can also be incorporated into a "soft" or "hard" paper or paperboard package, optionally imprinted with brand specific information; and can also be covered with an exterior clear overwrap of a heat sealable polymeric film which is heat sealed to form the overwrap.

The crosslinked polymer offers several advantages over the polyvinyl chloride polymer coatings commonly used in cigarette packaging. The crosslinked polymer tends to discolor at a relatively lower rate than the polyvinyl chloride, and also provides a better barrier against passage of water and oxygen through the polymer layer.

Several means for providing a thin polymer coating to a surface of a thin sheet of a material are known to those of skill in the art and can be used to provide the polymer coating on the metal foil. A preferred method for preparing the laminate involves placing the metal foil on a device that continuously feeds the foil through a device which adds liquid monomer to the foil, then through a device which spreads the liquid evenly to form a thin layer of defined thickness, then through a device which applies a source of UV light or electron beam radiation, such that the monomer polymerizes. The resulting polymer coated foil can then be rolled up, and the other side coated in a similar manner. Devices which perform these steps are known in the art. The device can coat one side at a time, or can coat both sides simultaneously, with a suitable monomer which can subsequently be crosslinked.

The laminated foil according to the invention can help maintain the aroma and moisture of the contents of cigarette packaging, and minimizes loss of volatile and/or heat sensitive flavor components over time. Unfavorable reactions between the metal foil and the flavor components and/or solvents used to incorporate the flavor components in the packaging can be minimized. The outside of the package is also protected from damage due to interactions of the solvents or flavor components with the inks or paper used to form the outer package because the passage of the solvents and flavor components through the foil is minimized.

The packaging material according to the invention includes a cross-linked polymer-coated foil laminate. The laminate includes one or more thin layers of a crosslinked polymer coated on each of the major surfaces of a metal foil layer.

In a preferred embodiment, the laminate has a thickness of 3 to 70 μm. For example, the laminate can include an aluminum foil layer with a thickness of 1 to 25 μm and a polymer layer with a thickness of 0.25 to 5 μm on each side of the aluminum foil layer. In another example, the laminate includes an outer polymer layer, a first aluminum foil layer, an inner polymer layer, a second aluminum foil layer and an outer polymer layer, each of the aluminum foil layers having a thickness of 1 to 25 μm and each of the polymer layers having a thickness of 0.25 to 5 μm.

The laminate can also include one or more flavor components. In a preferred embodiment, a material which includes one or more volatile flavor components (e.g., menthol) can be adhered to one of the crosslinked polymer layers. In another preferred embodiment, a solution of one or more flavor components is applied to one of the polymer-coated layers. This surface is then used to form the inside surface of the cigarette packaging.

The crosslinked polymer coating offers several advantages over conventional polyvinyl chloride polymer coatings commonly used in cigarette packaging. For example, the crosslinked polymer tends to discolor at a lower rate than the polyvinyl chloride. Further, the crosslinked polymer coating can also provides a better barrier against passage of water and oxygen through the polymer layer. For example, packaging according to the invention can have an oxygen permeability of $\leq 0.5$ cc $O_2/m^2$-day and a water permeability of $\leq 1.55$ g $H_2O/m^2$-day. This represents a significant improvement over the permeability of conventional cigarette packaging which employs a PVC coating on aluminum foil.

Any metal foil commonly used in preparing cigarette packaging can be used. Examples of suitable metal foils include aluminum and tin. The thickness of the foil is preferably between 0.0002 and 0.006 inches, more preferably between 0.001 and 0.005 inch. The metal preferably includes a thin layer of metal oxide which is in contact with each of the crosslinked polymer layers. The layer of oxide can facilitate adhesion of the cross-linked polymer coating to the foil surface.

Any crosslinkable monomer, or combinations of crosslinkable monomers, can be used to prepare the crosslinked polymer layer(s) on the surfaces of the metal foil. Preferred monomers are monomers which are polymerizable via free radical polymerization, and more preferred are monomers which include one or more carbon-carbon double bonds. The most preferred monomers are acrylates.

Examples of suitable acrylates include acrylic acid, methacrylic acid, methyl acrylate, methyl methacrylate, ethyl acrylate, propyl acrylate, butyl acrylate, pentyl acrylate, hexylacrylate, 2-ethylhexylacrylate, isobornylacrylate, decyl-acrylate, laurylacrylate, stearylacrylate, 2-ethoxyethoxy-ethylacrylate, isodecyl acrylate, isooctyl acrylate, and blends thereof.

Hydroxyalkyl acrylates or (meth)acrylates can also be used, in which, preferably, the hydrocarbon part of the hydroxyalkyl group has approximately from 2 to 12 carbon atoms, such as hydroxyethyl, hydroxypropyl, hydroxybutyl or tetrapropylene glycol (meth)acrylate.

Styrene and other aryl rings substituted with one or more double bonds are also suitable. Butadiene and copolymers of butadiene with styrene and/or one or more acrylates can also be used. Vinyl ethers, such as laurylvinylether and 2-ethylhexylvinyl ether, can also be used, as can other olefinic monomers such as N-vinyl formamide, vinyl-caprolactam, N-vinylpyrrolidone, and the like.

Styrene-maleic anhydride copolymer, or copolymers of styrene and other unsaturated carboxylic anhydrides such as itaconic and citraconic acids can also be used. As examples of monovalent alcohols which can, where appropriate, be used for modifying the styrene-carboxylic anhydride base copolymer there may be mentioned short-chain (from 1 to 6 carbon atoms) aliphatic alcohols such as methanol, ethanol, propanol, butanol and 1-methoxy-2-propanol, and long-chain (approximately 7 to 22 carbon atoms) aliphatic alcohols, such as stearyl alcohol.

Reactive diluents can be used, alone or in combination with other monomers, to form monomer solutions which flow evenly, and provide a 100 percent solid coating. Suitable reactive diluents include multifunctional (meth)acrylates, and more particularly, polyol poly(meth)acrylates, for example, ethylene glycol, propylene glycol, 1,3-butanediol, 1,4-butanediol, 1,6-hexanediol, neo pentyl glycol, 1,4-cyclohexanediol, 1,4-cyclohexanedimethanol, 2,2,4-trimethyl-1,3-pentanediol, 2-ethyl-2-methyl-1,3-propanediol, 2,2-diethyl-1,3-propanediol, diethylene glycol, dipropylene glycol, triethylene glycol, tripropylene glycol, tetraethylene glycol, tetrapropylene glycol, trimethylolethane, trimethylolpropane, glycerol and pentaerythritol diacrylates and dimethacrylates, trimethylolethane, trimethylolpropane, glycerol and pentaerythritol triacrylates and trimethacrylates, pentaerythritol tetraacrylates and tetramethacrylates, dipentaerythritol di(meth)acrylates to hexa(meth)acrylates, poly (meth)acrylates of mono- or polyethoxylated or mono- or polypropoxylated polyols, such as triethoxylated trimethylolpropane and tripropoxylated trimethylolpropane triacrylate and trimethacrylate, tripropoxylated glycerol triacrylate and trimethacrylate, tetraethoxylated pentaerythritol triacrylate, trimethacrylate, tetraacrylate and tetramethacrylate, and mixtures thereof in any proportions. Among these, preference is given to those which have the effect of lowering the viscosity of the composition, such as especially ethoxylated trimethylolpropane triacrylate and polyethylene glycol diacrylates.

Another type of reactive diluent that can be used is a compound having an aromatic group. Particular examples of reactive diluents having an aromatic group include: ethyleneglycolphenyletheracrylate, polyethyleneglycolphenyletheracrylate, polypropyleneglycolphenylether-acrylate, and alkyl-substituted phenyl derivatives of the above monomers, such as polyethyleneglycol-nonylphenyletheracrylate.

The reactive diluent can also include a diluent having two or more functional groups capable of polymerization. Particular examples of such monomers include: C2-C18 hydrocarbon-diol diacrylates, C4-C18 hydrocarbon divinylethers, C3-C18 hydrocarbon triacrylates, and the polyether analogues thereof, and the like, such as 1,6-hexanediol diacrylate, hexanediol divinylether, triethylene-glycol diacrylate, pentaerythritol-triacrylate, ethoxylated bisphenol-A diacrylate, and tripropyleneglycol diacrylate.

The above monomers can be used alone or in any suitable combination, to provide the crosslinked polymer coatings according to the invention.

The compositions can also include between 1 and 15% by weight, preferably between 3 to 12% by weight of a photoinitiator when the monomers are intended to be cured by UV radiation. When the cure is performed by electron beam radiation, no photoinitiator is required.

The photoinitiator employed in the crosslinkable composition according to the invention may be any compound capable of generating free radicals under the effect of ultraviolet radiation. Suitable photoinitiators include:

alpha-diketones such as benzil and diacetyl; acyloins such as benzoin; acyloin ethers such as benzoin methyl ether, benzoin ethyl ether, benzoin isopropyl ether and benzoin isobutyl ether; thioxanthones such as thioxanthone, 2,4-diethylthioxanthone, thioxanthone-1-sulphonic or isopropylthioxanthone-4-sulphonic acid, isopropylthioxanthone and 2-chlorothioxanthone; benzophenones like benzophenone, 4,4-bis(dimethylamino)benzophenone, 4,4'-bis(diethylamino)benzophenone or 4,4'-diethylaminobenzophenone, Michler's ketone; propiophenones like 2-hydroxy-2-methylpropiophenone or 4'-isopropyl-2-hydroxy-2-methylpropiophenone; acetophenones like acetophenone, p-dimethylamino acetophenone, alpha,alpha'-dimethoxyacetoxyacetophenone, 2,2-dimethoxy-2-phenylacetophenone, p-methoxyacetophenone, 2-methyl-[4-(methylthio)phenyl]-2-morpholino-1-propanone, 2,2-diethoxyacetophenone, 4'-phenoxy-2,2-dichloroacetophenone, 2-benzyl-2-N,N-dimethylamino-1-

(4-morpholinophenyl)-1-butanone, 2,2-dimethoxy-2-phenylacetophenone or 2-hydroxy-2-methyl-1-phenylpropanone; quinones like anthraquinone, 2-ethylanthraquinone, 2-chloroanthraquinone or 1,4-naphthoquinone; alpha-hydroxyaryl ketones like 1-hydroxycyclohexyl phenyl ketone; halogenated compounds like phenacyl chloride, tribromomethyl phenyl sulphone or tris(trichloromethyl)-s-triazine; peroxides like di-t-butyl peroxide; and other compounds, like benzil dimethyl ketal, isoamyl N,N-dimethylaminobenzoate, ethyl N,N-dimethylaminobenzoate, benzoin benzoate, 2-hydroxy-2-methyl-1-phenylpropanone or .alpha.-acyloxime ester.

These compounds can be employed either individually or in the form of a mixture of at least two photoinitiators. Further, at least one photoactivating agent may be associated with the initiator or the photoinitiating system.

The proportion of photoinitiator in the crosslinkable composition according to the invention is preferably between about 2 and about 15 wt. %, preferably approximately between 3 and 9 wt. %, relative to the total weight of the monomer composition.

Additional additives can also be added to the monomer composition. Examples of suitable additives which can be used include, but are not limited to, catalysts, lubricants, wetting agents, antioxidants and stabilizers. Additives include inorganic pigments such as titanium dioxide, iron oxides, and carbon black, as well as organic pigments such as copper phthalocyanine blue, β-naphthol red, azo yellows and dioxazinc violet. The pigments can be used in a proportion of 0.5 to 40% by weight relative to the total weight of the monomer composition.

A variety of flavorants have been developed for use with tobacco products. Suitable tobacco flavorants are disclosed, for example, in U.S. Pat. Nos. 3,580,259; 3,625,224; 3,722,516; 3,750,674; 3,879,425; 3,881,025; 3,884,247; 3,890,981; 3,903,900; 3,914,451; 3,915,175; 3,920,027; 3,924,644; 3,937,228; 3,943,943; 3,568,387; and 3,379,754. Examples of flavor components which can be added to tobacco products include, but are not limited to, menthol, licorice, clove, anise, cinnamon, sandalwood, geranium, rose oil, vanilla, lemon oil, cassia, spearmint, fennel, ginger, α-terpineol, ethyl phenyl acetate, α-limonene, β-ionone, furfural, β-caryophyllene, barley tobacco flavor, methyl salicylate, spearmint oil, thyme oil, maltol, fennel oil, spearmint oil, peppermint oil, and the like. The preferred flavor component according to the invention is menthol.

The flavor components can be dissolved in a suitable solvent and applied directly to the polymer-coated surface. Alternatively, the flavor components can be incorporated into a material releases the components over time. This material can be adhered or otherwise attached to the polymer-coated surface. Any material capable of storing and releasing over time a volatile and/or heat sensitive flavor component can be used. Preferred materials are paper, more particularly, 19 pound or 30 pound Menominee or Crown Vantage paper. For example, a conventional flavorant such as menthol can be coated onto or impregnated into the paper in any suitable amount using any suitable technique.

The laminate can be prepared, for example, by applying a suitable monomer or mixture of monomers to a surface of the foil, curing the monomer, and repeating the process on the other side of the foil.

Figure 1B:
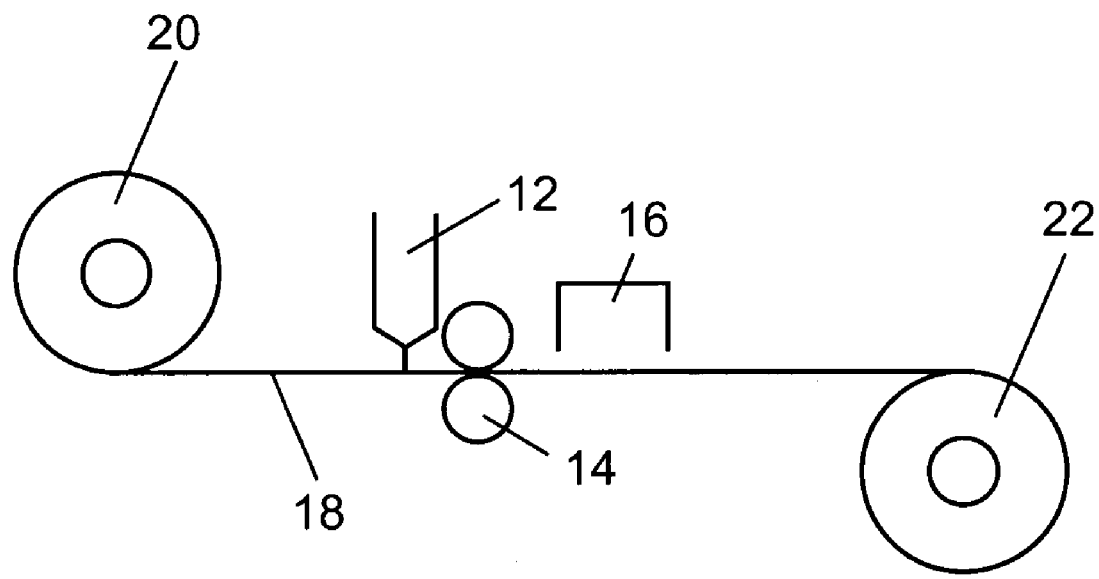

A suitable apparatus for preparing the laminate is shown in FIGS. 1A and 1B. As shown in FIG. 1A, a roll of untreated foil 10 is unrolled. The untreated foil will have a native oxide layer on each of the major surfaces thereof. The foil is then fed to a coating application device 12 where a crosslinkable monomer is applied to a first major surface of the untreated foil. The coating can be applied by spraying a monomer solution onto the surface of the foil. As shown, the foil with the applied monomer coating is then fed into the nip between a set of rollers 14. The rollers 14 can be used to spread the monomer coating. In this manner, the coating thickness can be controlled and a more uniform coating thickness can be provided. The coating thickness can also be controlled using other spreading devices such as a doctor blade. The coated foil is then fed to a curing device 16 where the monomer coating is irradiated with a source of radiation to polymerize the monomer and form the cross-linked polymer coating. The resulting coated foil 18 is then taken up on a roll to form roll 20 of foil coated on one side with the crosslinked polymer coating.

According to the invention, any source of high-energy radiation can be employed to cross-link the monomer coating. For example, electron beam or ultraviolet (UV) radiation can be used. Ultraviolet radiation can be obtained, for example, by means of a UV lamp. Suitable conditions for polymerizing monomer coatings using high-energy UV and e-beam radiation are disclosed, for example, in Affinito et al., "PML/oxide/PML barrier layer performance differences arising from use of UV or electron beam polymerization of the PML layers," Thin Solid Films, 308-309 (1997) 19-25.

Foil 18 having one surface coated with a cross linked polymer coating as set forth above can be used to form a polymer coated foil laminate as described below with reference to FIG. 4. Alternatively, the opposite surface of the foil can also be coated with a cross-linked polymer coating as illustrated in FIG. 1B.

As shown in FIG. 1B, roll 20 of foil of FIG. 1A can be unrolled and the unrolled foil 18 fed to coating device 12 such that the uncoated major surface of the foil is coated with the monomer coating. As shown, the foil with the applied monomer coating is then fed into the nip between a set of rollers 14. The coated foil is then fed to curing device 16 where the monomer coating is irradiated with a source of radiation to polymerize the monomer and form the cross-linked polymer coating. The resulting sheet, which is coated on both major surfaces with a cross-linked polymer coating, can then be taken up to form roll 22. The foil coated on both major surfaces with a cross-linked polymer coating can be used to form a metal foil laminate according to the invention as set forth in the description of FIG. 3 below.

Figure 2:
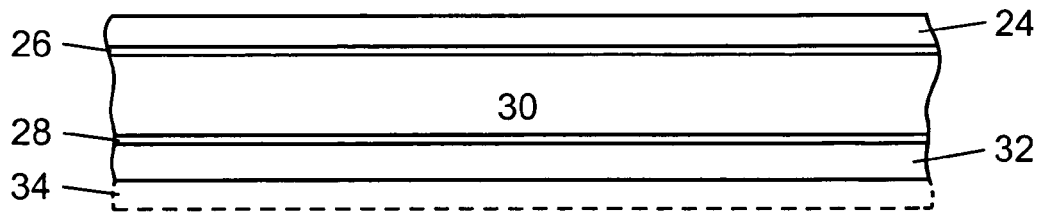
FIG. 2 is a cross-sectional view of a cross-linked polymer coated foil according to the invention.

FIG. 2 shows a cross-section of a metal foil 30 coated on both major surfaces with a cross-linked polymer 24, 32 according to the invention. According to one embodiment of the invention, a flavor component can be applied to one side of the polymer coated film. Preferably, a paper 34 such as tissue or bond paper, e.g., 19 or 30 pound paper available from Menominee Paper Company or Crown Vantage Incorporated is adhered to the laminate and the flavor component is applied to the paper. For cigarette packaging, 19 pound (19 pounds per ream of 3000 square feet) paper is typically laminated to aluminum foil to use as the inner foil wrap of flip top boxes and 30 pound paper is typically used for soft cigarette packs. If the flavor component is applied as a solution to one side of the polymer-coated film, it is preferably applied by spraying, although other methods known to those of skill in the art can also be used. Other methods of applying the monomer solution include, but are not limited to, roll coating.

If the flavor component is incorporated in a material which material is then applied to the polymer-coated foil, the flavor component can be incorporated in the material in a variety of ways. For example, microcapsules or other microparticles including the flavor component can be incorporated into the material. Alternatively, a solution of the flavor component can be coated onto or impregnated into the material. In either case, the material is preferably adhered to one side of the foil via extrusion lamination. In such a process, a layer of adhesive is applied to one side of the polymer-coated foil (laminate) and then the material is adhered to the adhesive via extrusion. Other methods for adhering a material to a polymer-coated surface are known to those of skill in the art, any of which can also be used.

The packaging described herein provides a package for smoking articles, such as cigarettes, cigars, cigarillos and the like. According to one embodiment of the invention, the cigarette package has a rectangular parallelepiped shape with an overlapping longitudinal side seam and overlapping top and bottom folded end flaps and is optionally heat sealed in substantially the same locations as a conventional cigarette package overwrap.

The laminated foil can be used as an inner wrap for a cigarette package. The inner wrap can be made by folding the foil into the desired shape in an appropriate manner and the seams adhered with an adhesive. The inner wrap can then be incorporated into a "soft" or "hard" paper or paperboard package which is optionally imprinted with brand specific information.

Although the laminate disclosed herein is especially useful in the packaging of smoking articles, it is also useful in packaging other articles or products, such as packaged foods that need to be protected from loss of moisture or flavor migration out of the package, and/or prevent ingress of oxygen or moisture into the product particularly those that are packaged in rectangular parallelepiped containers. Examples of other products that may be advantageously packaged include chewing tobacco and pipe tobacco, the freshness and moisture content of which is desired to be maintained.

IV. Methods of Preparing the Packaging

The packaging can be prepared by means known to those of skill in the art. In one embodiment, a flavor component is applied to one surface of the laminated foil, either by extrusion laminating a material which incorporates the flavor component, or by applying a solution including the flavor component.

An inner wrapping for a cigarette package can then be formed by folding the laminated foil. Methods for forming inner wrappings as part of a cigarette package including a foil laminate are disclosed, for example, in U.S. Pat. No. 4,789,060 to Focke et al. The steps for forming the package include folding the foil laminate in an appropriate manner to form a cigarette package or inner wrapping thereof, and adhering the folds with a suitable adhesive. The adhesive can be applied using rollers.

After the inner wrapping is formed, it can then be incorporated into a conventional soft or hard pack. The resulting cigarette package can then be covered with a heat sealable polymer overwrap which can be heat sealed to provide the final product. In a preferred embodiment, the packages are provided with a pull-off opening flap, using techniques well known to those of skill in the art.

The present invention will be better understood with reference to the following non-limiting examples:

A thin compact, adherent film of aluminum oxide forms rapidly when a fresh aluminum surface is exposed to air. This native oxide layer grows to a stable thickness. At ambient temperatures, the oxide film formed in air is about 5 nm thick (50 Angstroms) thick. However, the thickness of the oxide layer can be increased by increasing the temperature. Aluminum oxide layers having thicknesses of about 100 to about 250 angstroms in thickness can therefore be formed at elevated temperatures.

In a process of making the two foil layer laminate, aluminum foils can be fed from a pair of rolls and a pre-determined amount of monomer can be applied to one side of each foil layer. For example, the monomer can be sprayed onto a foil as it is guided through rollers with a very narrow space between them so as to spread the monomer evenly across the foil. The foil can then be passed over another set of rollers such that the other side is also treated with monomer and cured, to obtain a foil that is coated on both sides by a cured polymer.

In making a laminate comprising two foil layers, two coated foils according to the invention can be laminated together using conventional laminating techniques. This laminate is illustrated in cross-section in FIG. 3. The resulting composite film 30 is made up of two layers of aluminum foil 30 each of which is covered on opposing major surfaces with an oxide layer 26, 28 and a cross-linked polymer coating 24, 32. An adhesive layer 36 bonds a cross-linked polymer coating layer of each of the coated foils together to form the laminate. A paper layer 34 can be adhered to the laminate and flavorant can be applied to the paper layer 34.

Alternatively, an outer surface of each of the foil layers can be coated with a cross-linked polymer coating according to the invention and the uncoated (oxide) surfaces thereof laminated together with an adhesive. This laminate is shown in cross-section in FIG. 4. This results in a composite film made up of two layers of aluminum foil, each of the aluminum foil layers coated on an outer surface with a cross-linked polymer coating and attached to each other through an interposed adhesive layer. Such a laminate could include an outer polymer layer having a thickness of 0.25 to 5 μm an aluminum foil layer having a thickness of 1 to 25 μm, two polymer layers having thicknesses of 0.25 to 5 μm, a second aluminum layer having a thickness of 1 to 25 μm, and an outer polymer layer having a thickness of 0.25 to 5 μm.

Figure 3:
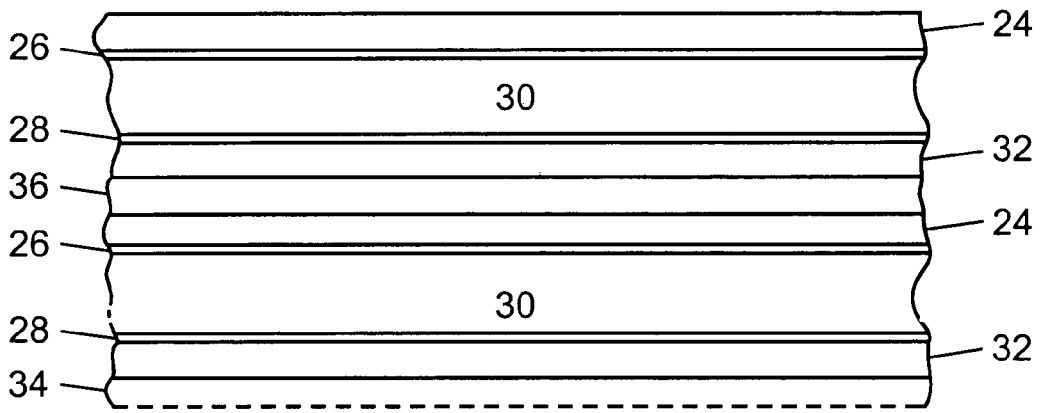
FIG. 3 shows a cross-linked polymer coated foil laminate having two foil layers according to a first embodiment of the invention.
Figure 4:
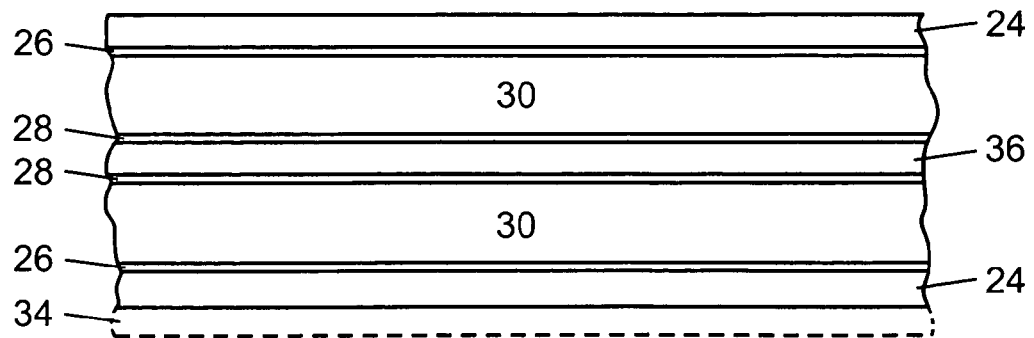
FIG. 4 shows a cross-linked polymer coated foil laminate having two foil layers according to a second embodiment of the invention.
Figure 5:
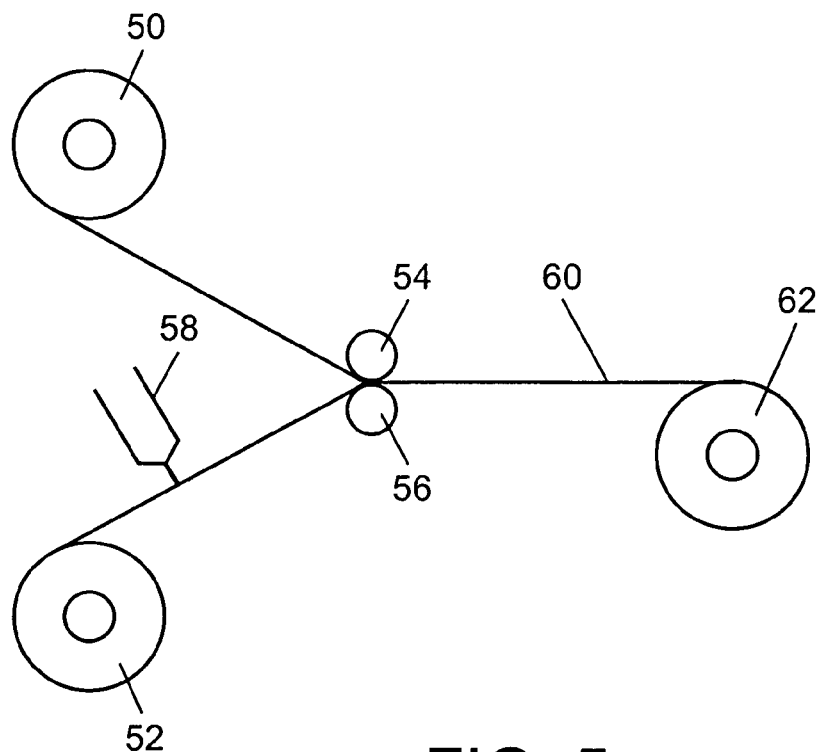
FIG. 5 is a schematic showing a method of making the cross-linked polymer coated foil laminate of FIG. 3 or 4.

FIG. 5 illustrates a method of making a laminate as set forth in FIG. 3 or 4 above wherein the adhesive is applied to one of the mating surfaces. In FIG. 5, rolls 50, 52 of coated foil according to the invention are fed into the nip between a pair of rolls 54, 56. As shown, adhesive is applied to one of the mating surfaces by an adhesive applicator 58 and the resulting laminate 60 is coiled on roll 62. If the adhesive is a thermosetting adhesive, the adhesive can be cured by heating. In making a laminate as set forth above, however, the adhesive can also be applied to one or both mating surfaces of the coated foils. Further, lamination can be conducted by an extrusion lamination technique or by other laminating techniques known in the art.

Figure 6:
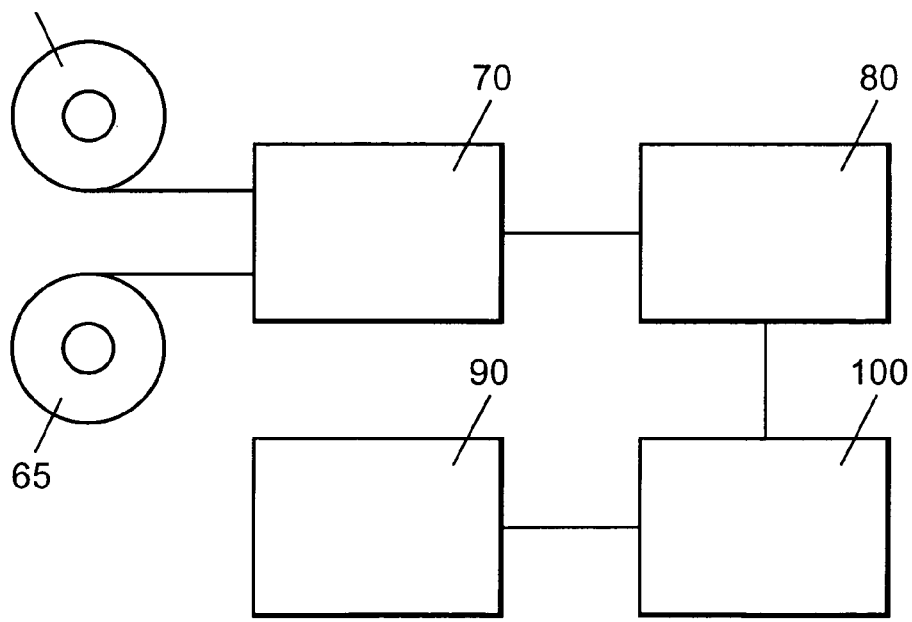
FIG. 6 is a simplified flow diagram of the steps involved in forming an inner wrapping from the cross-linked polymer coated foil according to the invention.

Steps for forming an inner wrapping for a cigarette package are shown in FIG. 6. As shown in FIG. 6, the polymer coated foil 65 can be run through an extrusion laminator 70 to apply the material containing the flavor component to the foil. As shown, the resulting foil laminate is then passed through an extrusion coater 80, a blank cutter 100, and a side seamer 90 in succession to form the cigarette package.

In order to provide a flavor component, a scented layer such as a scented paper layer can be applied to one side of the laminate and attached thereto by a suitable adhesive. Alternatively, a solution such as an alcohol/menthol solution can be applied (e.g., by spraying) to one side of the laminate to form the flavor component.

The laminate according to the invention preferably has at least two foil layers. However, larger numbers of foil layers can be used. For example, the laminate can include from 3 to 5 foil layers. The overall thickness of the laminate is preferably 3 to 70 microns. For a laminate having two foil layers, the overall laminate thickness is preferably from 3 to 70 microns.

While this invention has been illustrated and described in accordance with a preferred embodiment, it is recognized that variations and changes may be made therein without departing from the invention as set forth in the claims.

What is claimed is:

1. A cigarette package comprising a laminate, wherein the laminate comprises:
    a metal foil layer having opposed major surfaces;
    a metal oxide layer on each of the major surfaces of the foil;
    a crosslinked polymer coating adhered to the metal oxide layer on both sides of the metal foil; and
    a flavor component in contact with one of the crosslinked polymer coatings,
wherein the thickness of the metal oxide layer is from about 100 angstroms to about 250 angstroms, and
wherein the laminate forms an inner wrap surrounding a bundle of cigarettes in the cigarette package.

2. The cigarette package of claim 1, wherein the metal foil is aluminum foil or tin foil and/or the flavor component is applied to a paper layer adhered to the laminate.

3. The cigarette package of claim 1, wherein the thickness of the metal foil is between approximately 1 and 25 µm.

4. The cigarette package of claim 1, wherein the polymer coating is a polymer comprising acrylate subunits.

5. The cigarette package of claim 1, wherein the thickness of the polymer coating is between approximately 0.25 and 5 µm.

6. The cigarette package of claim 1, wherein the laminate further comprises:
    a paper layer applied to the polymer coating on one side of the metal foil; and
    a second laminate applied to the polymer coating on the other side of the metal foil.

7. The cigarette package of claim 6, wherein the second laminate comprises:
    a metal foil layer having opposed major surfaces;
    a metal oxide layer on each of the major surfaces of the foil; and
    a crosslinked polymer coating adhered to the metal oxide layer on both sides of the metal foil.

8. The cigarette package of claim 1, wherein the flavor component is menthol.

9. The cigarette package of claim 8, wherein the menthol is applied to the crosslinked polymer coating on one side of the laminate in the form of an alcohol/menthol solution.

10. The cigarette package of claim 8, wherein the menthol is applied to the laminate in the form of an alcohol/menthol solution.

11. The cigarette package of claim 8, wherein the menthol is applied to the laminate in the form of a menthol-containing paper adhesively bonded to the laminate.

12. The cigarette package of claim 11, wherein the amount of menthol in the paper is between about 2-65 weight percent, based on the dry weight of the paper.

13. The cigarette package of claim 11, wherein the paper comprises 19 pound or heavier paper.

14. A cigarette package comprising
    a flexible laminate,
wherein the flexible laminate comprises:
    a metal foil layer having opposed major surfaces;
    a metal oxide layer on each of the major surfaces of the foil;
    a crosslinked polymer coating adhered to each of the metal oxide layers; and
    a flavor component in contact with one of the crosslinked polymer coatings,
wherein the flavor component is applied in solution to one of the crosslinked polymer coatings,
wherein the thickness of the metal oxide layer is from about 100 angstroms to about 250 angstroms, and
wherein the flexible laminate forms an inner wrap surrounding a bundle of cigarettes in the cigarette package.

15. The cigarette package of claim 14, wherein the flavor component faces an interior of the package.

16. A cigarette package, comprising:
    a crosslinked polymer coated foil laminate including:
        a flavorant layer;
        a first crosslinked polymer layer in contact with the flavorant layer, wherein the flavorant layer is applied as a solution to a surface of the first crosslinked polymer layer;
        a metal foil layer including oxidized surfaces thereon in contact with the first crosslinked polymer layer; and
        a second crosslinked polymer layer in contact with the metal foil layer,
    wherein the thickness of each oxidized surface is from about 100 angstroms to about 250 angstroms, and
    wherein the crosslinked polymer coated foil laminate forms an inner wrap surrounding a bundle of cigarettes in the cigarette package.

17. The cigarette package of claim 16, wherein the flavorant layer is coated directly onto the first crosslinked polymer layer.

* * * * *